(12) United States Patent
Liang

(10) Patent No.: US 9,523,840 B2
(45) Date of Patent: Dec. 20, 2016

(54) LENS ASSEMBLY

(71) Applicants: Sintai Optical (Shenzhen) Co., Ltd., Shenzhen, Guangdong Province (CN); AO Ether Corporation, Taichung (TW)

(72) Inventor: Yuan-Fan Liang, Taichung (TW)

(73) Assignees: SINTAI OPTICAL (SHENZHEN) CO., LTD., Shenzhen, Guangdong Province (CN); AO ETHER CORPORATION, Taichung (TW)

( * ) Notice: Subject to any disclaimer, the term of this patent is extended or adjusted under 35 U.S.C. 154(b) by 0 days.

(21) Appl. No.: 14/920,995

(22) Filed: Oct. 23, 2015

(65) Prior Publication Data

US 2016/0116710 A1   Apr. 28, 2016

(30) Foreign Application Priority Data

Oct. 27, 2014   (TW) ............................. 103137037 A

(51) Int. Cl.
*G02B 13/18* (2006.01)
*G02B 3/02* (2006.01)
*G02B 13/00* (2006.01)
*G02B 9/58* (2006.01)

(52) U.S. Cl.
CPC ............... *G02B 13/004* (2013.01); *G02B 9/58* (2013.01)

(58) Field of Classification Search
CPC ................................ G02B 13/004; G02B 9/58
USPC .................................................... 359/715, 782
See application file for complete search history.

(56) References Cited

FOREIGN PATENT DOCUMENTS

JP            5264895 A       10/1993

*Primary Examiner* — Alicia M Harrington
(74) *Attorney, Agent, or Firm* — McClure, Qualey & Rodack, LLP

(57) ABSTRACT

A lens assembly includes a first lens, a second lens, a stop, a third lens and a fourth lens, all of which are arranged in sequence from an object side to an image side along an optical axis. The first lens and the fourth lens are with negative refractive power. The second lens and the third lens are biconvex lenses with positive refractive power. The first, third, fourth lens include an object side surface and an image side surface respectively, wherein at least one of the object side surface and the image side surface is an aspheric surface. The lens assembly satisfies: $0<|f_1/f_2|<|f_4/f_3|<2$, $f/D_{12}>1$ wherein $f_1$, $f_2$, $f_3$, $f_4$, and $f$ is an effective focal length of the first, second, third, fourth lens and the lens assembly, and $D_{12}$ is an interval from the first lens to the second lens along the optical axis.

9 Claims, 10 Drawing Sheets

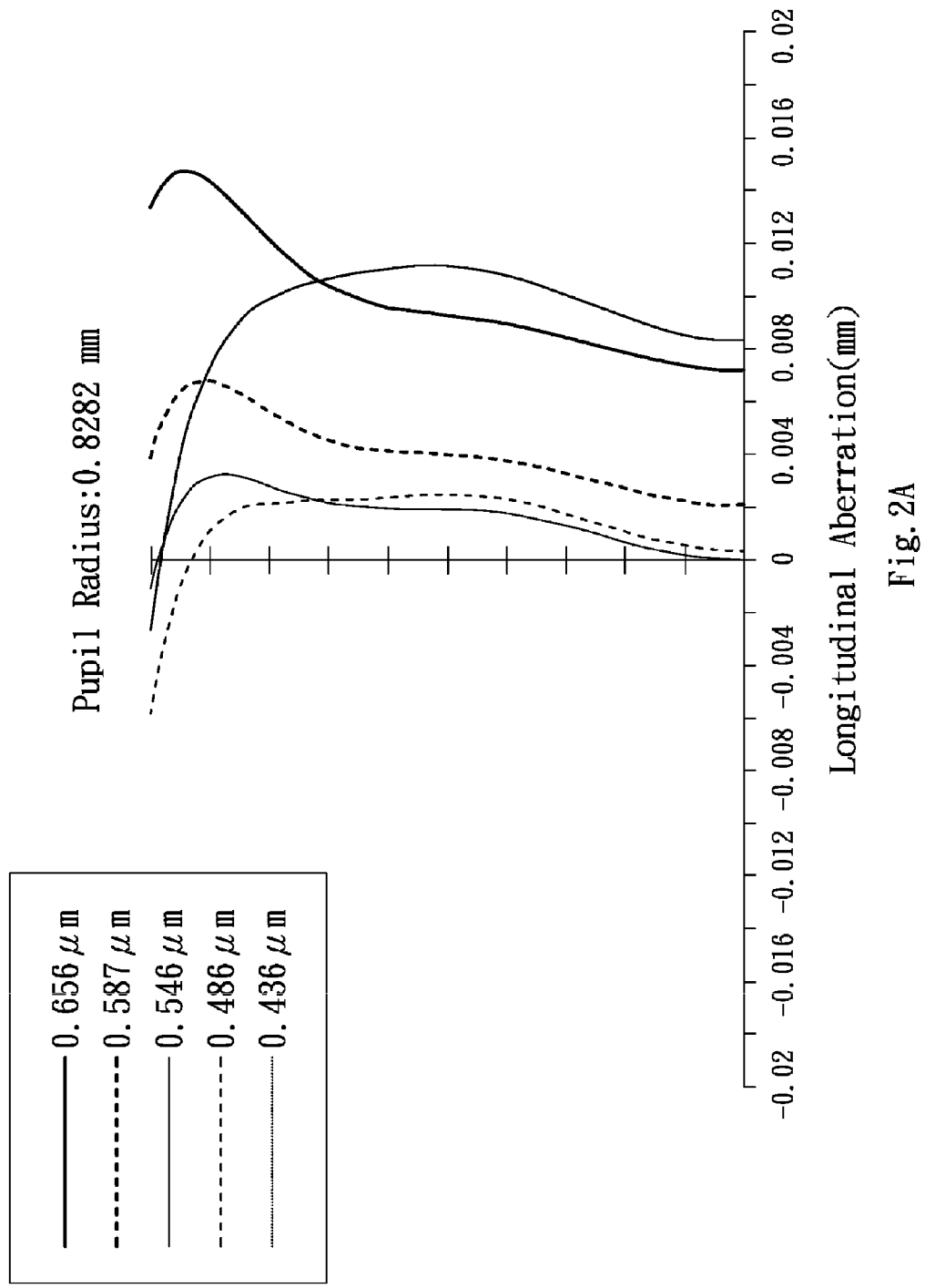

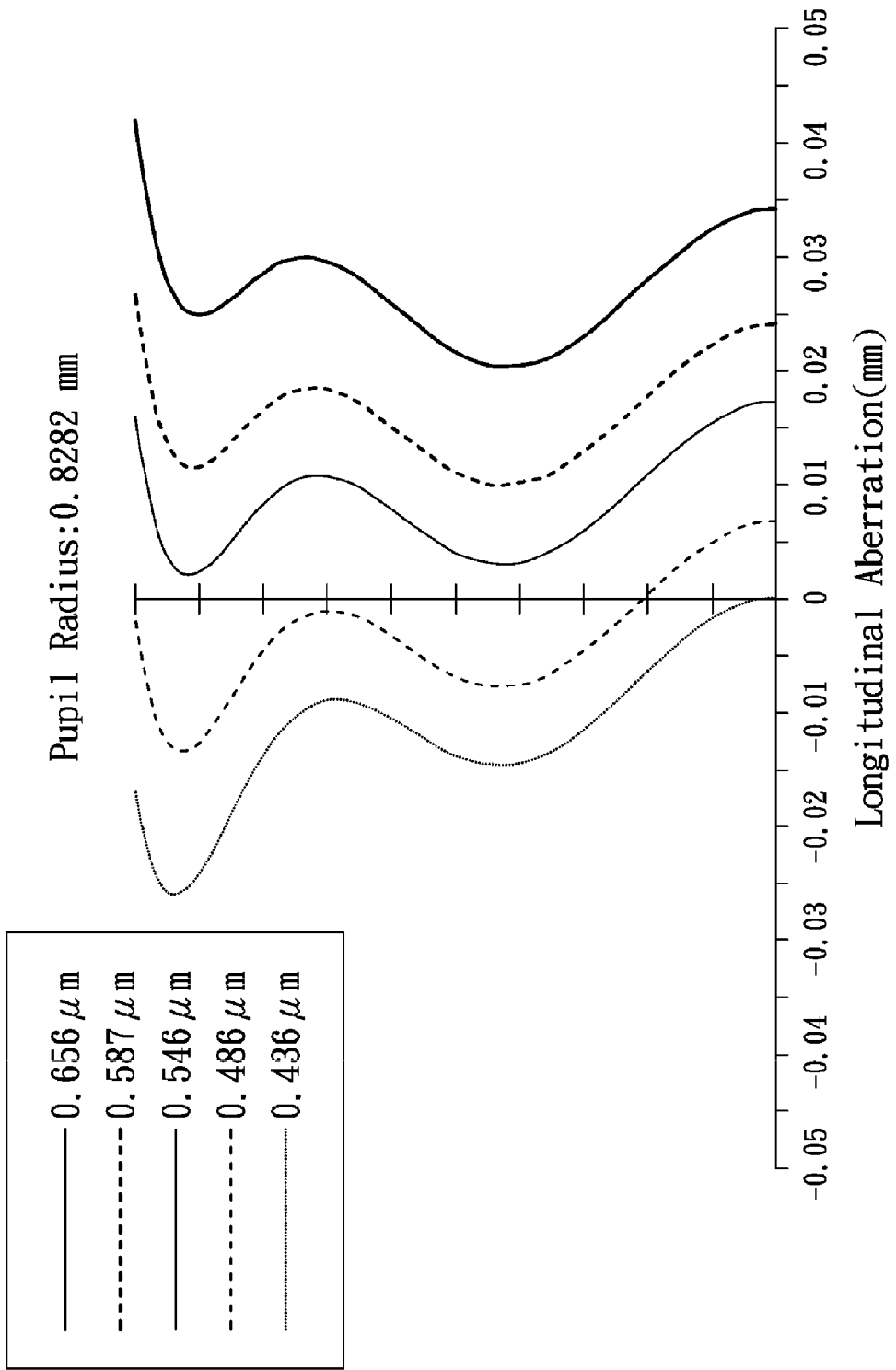

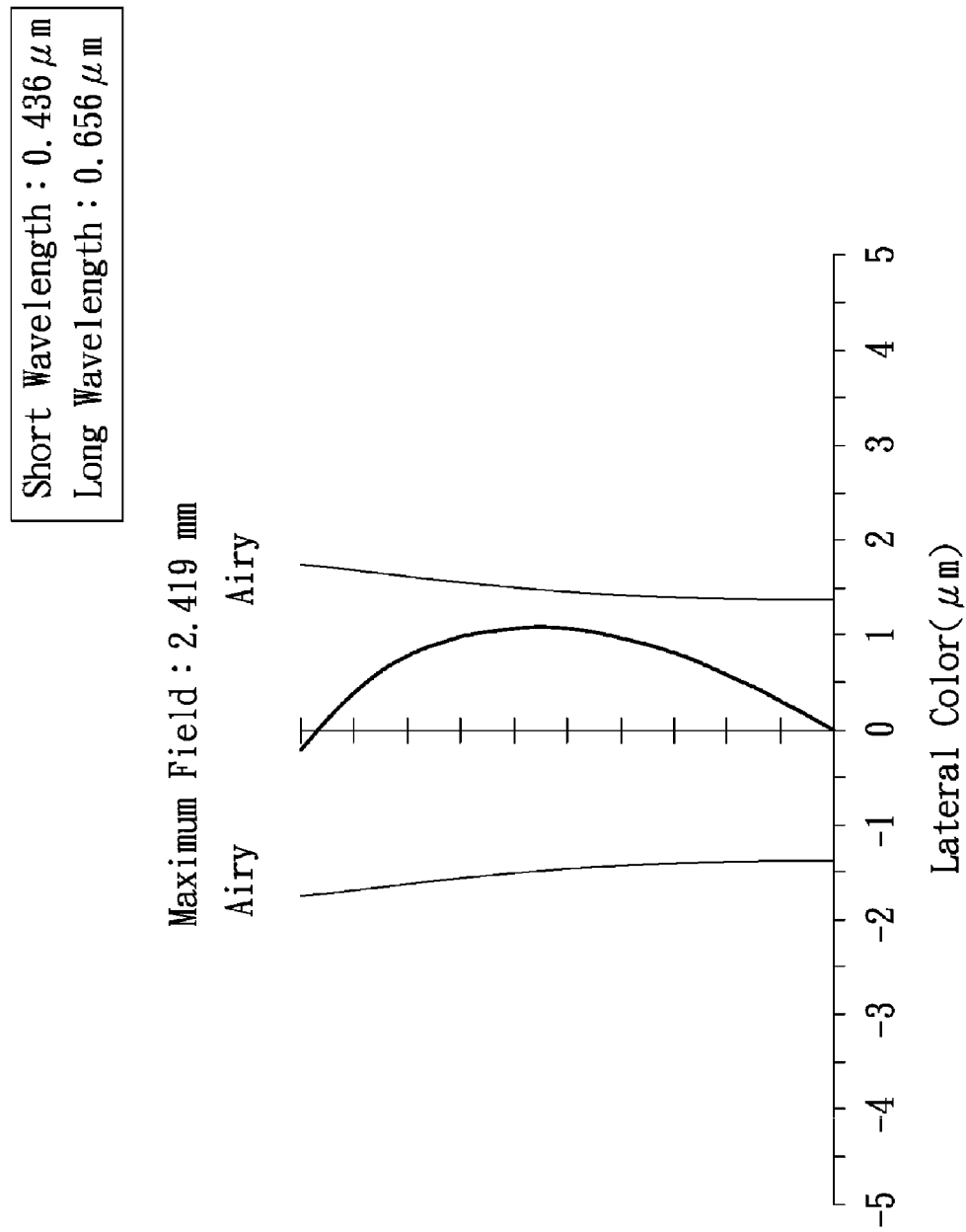

LENS ASSEMBLY

BACKGROUND OF THE INVENTION

Field of the Invention

The invention relates to a lens assembly.

Description of the Related Art

Nowadays, the development trend of consumer electronic products is continuously toward miniaturization. Therefore, lens assemblies that are used for consumer electronic products also need to be miniaturized. The volume of known lens assembly is relatively large and can't satisfy requirement of present. Therefore, a lens assembly that is used for consumer electronic products needs a new structure in order to meet the requirements of miniaturization, small F-number and high resolution at the same time.

BRIEF SUMMARY OF THE INVENTION

The invention provides a lens assembly to solve the above problems. The lens assembly of the invention is provided with characteristics of a shortened total lens length and a decreased F-number and still has a good optical performance.

The lens assembly in accordance with an exemplary embodiment of the invention includes a first lens, a second lens, a stop, a third lens and a fourth lens, all of which are arranged in sequence from an object side to an image side along an optical axis. The first lens is with negative refractive power and includes an object side surface and an image side surface, wherein at least one of the object side surface and the image side surface is an aspheric surface. The second lens is a biconvex lens with positive refractive power. The third lens is a biconvex lens with positive refractive power and includes an object side surface and an image side surface, wherein at least one of the object side surface and the image side surface is an aspheric surface. The fourth lens is with negative refractive power and includes an object side surface and an image side surface, wherein at least one of the object side surface and the image side surface is an aspheric surface. The lens assembly satisfies: $0<|f_1/f_2|<|f_4/f_3|<2$, $f/D_{12}>1$ wherein $f_1$ is an effective focal length of the first lens, $f_2$ is an effective focal length of the second lens, $f_3$ is an effective focal length of the third lens, $f_4$ is an effective focal length of the fourth lens, f is an effective focal length of the lens assembly and $D_{12}$ is an interval from an image side surface of the first lens to an object side surface of the second lens along the optical axis.

In another exemplary embodiment, the third lens and the fourth lens satisfy $0.1<Vd_4/f<Vd_3/f<50$, wherein $Vd_4$ is an Abbe number of the fourth lens, $Vd_3$ is an Abbe number of the third lens and f is an effective focal length of the lens assembly.

In yet another exemplary embodiment, the lens assembly satisfies $D_{34}/D_{12}>0.02$, wherein $D_{12}$ is an interval from an image side surface of the first lens to an object side surface of the second lens along the optical axis, and $D_{34}$ is an interval from an image side surface of the third lens to an object side surface of the fourth lens along the optical axis.

In another exemplary embodiment, the first lens, the third lens and the fourth lens are made of plastic material, and the second lens is made of glass material.

In yet another exemplary embodiment, the first lens, the second lens, the third lens and the fourth lens are made of plastic material.

The lens assembly in accordance with another exemplary embodiment of the invention includes a first lens, a second lens, a stop, a third lens and a fourth lens, all of which are arranged in sequence from an object side to an image side along an optical axis. The first lens is with negative refractive power and includes an object side surface and an image side surface, wherein at least one of the object side surface and the image side surface is an aspheric surface. The second lens is a biconvex lens with positive refractive power. The third lens is a biconvex lens with positive refractive power and includes an object side surface and an image side surface, wherein at least one of the object side surface and the image side surface is an aspheric surface. The fourth lens is with negative refractive power and includes an object side surface and an image side surface, wherein at least one of the object side surface and the image side surface is an aspheric surface. The lens assembly satisfies: $0<|f_1/f_2|<|f_4/f_3|<2$, BFL/TTL<0.4 wherein $f_1$ is an effective focal length of the first lens, $f_2$ is an effective focal length of the second lens, $f_3$ is an effective focal length of the third lens, $f_4$ is an effective focal length of the fourth lens, f is an effective focal length of the lens assembly, BFL is an interval from an image side surface of the fourth lens to an image plane along the optical axis and TTL is an interval from an object side surface of the first lens to the image plane along the optical axis.

The lens assembly in accordance with another exemplary embodiment of the invention includes a first lens, a second lens, a stop, a third lens and a fourth lens, all of which are arranged in sequence from an object side to an image side along an optical axis. The first lens is with negative refractive power and includes an object side surface and an image side surface, wherein at least one of the object side surface and the image side surface is an aspheric surface. The second lens is a biconvex lens with positive refractive power. The third lens is a biconvex lens with positive refractive power and includes an object side surface and an image side surface, wherein at least one of the object side surface and the image side surface is an aspheric surface. The fourth lens is with negative refractive power and includes an object side surface and an image side surface, wherein at least one of the object side surface and the image side surface is an aspheric surface. The lens assembly satisfies: $0<|f_1/f_2|<|f_4/f_3|<2$, $|f_1/f|\leq1.5$ wherein $f_1$ is an effective focal length of the first lens, $f_2$ is an effective focal length of the second lens, $f_3$ is an effective focal length of the third lens, $f_4$ is an effective focal length of the fourth lens and f is an effective focal length of the lens assembly.

The lens assembly in accordance with another exemplary embodiment of the invention includes a first lens, a second lens, a stop, a third lens and a fourth lens, all of which are arranged in sequence from an object side to an image side along an optical axis. The first lens is with negative refractive power and includes an object side surface and an image side surface, wherein at least one of the object side surface and the image side surface is an aspheric surface. The second lens is a biconvex lens with positive refractive power. The third lens is a biconvex lens with positive refractive power and includes an object side surface and an image side surface, wherein at least one of the object side surface and the image side surface is an aspheric surface. The fourth lens is with negative refractive power and includes an object side surface and an image side surface, wherein at least one of the object side surface and the image side surface is an aspheric surface. The lens assembly satisfies: $0<|f_1/f_2|<|f_4/f_3|<2$, $0.1<f/Nd_4<f/Nd_3<3$ wherein $f_1$ is an effective focal length of the first lens, $f_2$ is an effective focal length of the second lens, $f_3$ is an effective focal length of the third lens, $f_4$ is an effective focal length of the fourth lens, f is an effective focal length of the lens assembly, $Nd_3$ is an index of refraction of the third lens and $Nd_4$ is an index of refraction of the fourth lens.

The lens assembly in accordance with another exemplary embodiment of the invention includes a first lens, a second lens, a stop, a third lens and a fourth lens, all of which are arranged in sequence from an object side to an image side along an optical axis. The first lens is with negative refractive power. The second lens is with positive refractive power. The third lens is with positive refractive power. The fourth lens is with negative refractive power. The lens assembly satisfies: $0<|f_1/f_2|<|f_4/f_3|<2$, $BFL/TTL<0.4$, $|f_1/f|\leq 1.5$, $f/D_{12}>1$, $0.1<Vd_4/f<Vd_3/f<50$, $0.1<f/Nd_4<f/Nd_3<3$, $D_{34}/D_{12}>0.02$ wherein $f_1$ is an effective focal length of the first lens, $f_2$ is an effective focal length of the second lens, $f_3$ is an effective focal length of the third lens, $f_4$ is an effective focal length of the fourth lens, f is an effective focal length of the lens assembly, BFL is an interval from an image side surface of the fourth lens to an image plane along the optical axis, TTL is an interval from an object side surface of the first lens to the image plane along the optical axis, $D_{12}$ is an interval from an image side surface of the first lens to an object side surface of the second lens along the optical axis, $D_{34}$ is an interval from an image side surface of the third lens to an object side surface of the fourth lens along the optical axis, $Vd_3$ is an Abbe number of the third lens, $Vd_4$ is an Abbe number of the fourth lens, $Nd_3$ is an index of refraction of the third lens and $Nd_4$ is an index of refraction of the fourth lens.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 2A depicts a longitudinal aberration diagram of the lens assembly in accordance with the first embodiment of the invention;

FIG. 4A depicts a longitudinal aberration diagram of the lens assembly in accordance with the second embodiment of the invention;

FIG. 4D is a lateral color diagram of the lens assembly in accordance with the second embodiment of the invention.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
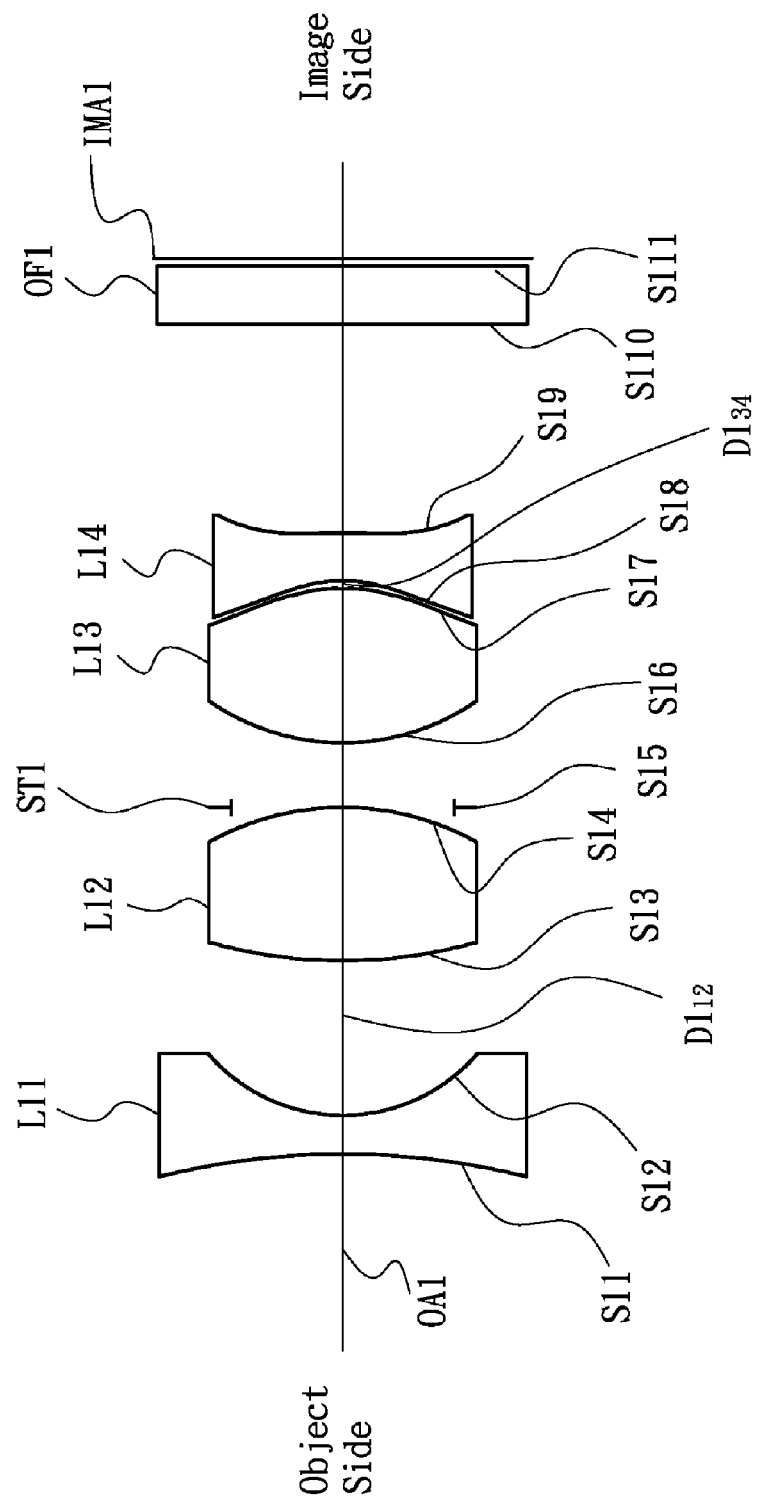
FIG. 1 is a lens layout diagram of a lens assembly in accordance with a first embodiment of the invention.

Referring to FIG. 1, FIG. 1 is a lens layout diagram of a lens assembly in accordance with a first embodiment of the invention. The lens assembly 1 includes a first lens L11, a second lens L12, a stop ST1, a third lens L13, a fourth lens L14 and an optical filter OF1, all of which are arranged in sequence from an object side to an image side along an optical axis OA1. In operation, an image of light rays from the object side is formed at an image plane IMA1. The first lens L11 is a biconcave lens with negative refractive and made of plastic material, wherein both of the object side surface S11 and image side surface S12 are aspheric surfaces. The second lens L12 is a biconvex lens with positive refractive power and made of glass material, wherein both of the object side surface S13 and image side surface S14 are spherical surfaces. The third lens L13 is a biconvex lens with positive refractive power and made of plastic material, wherein both of the object side surface S16 and image side surface S17 are aspheric surfaces. The fourth lens L14 is a concave-convex lens with negative refractive power and made of plastic material, wherein the object side surface S18 is a concave surface, the image side surface S19 is a convex surface and both of the object side surface S18 and image side surface S19 are aspheric surfaces. There is an air space between the third lens L13 and the fourth lens L14. Both of the object side surface S110 and image side surface S111 of the optical filter OF1 are plane surfaces.

In order to maintain excellent optical performance of the lens assembly in accordance with the first embodiment of the invention, the lens assembly 1 must satisfies the following seven conditions:

$$0<|f1_1/f1_2|<|f1_4/f1_3|<2 \quad (1)$$

$$BFL1/TTL1<0.4 \quad (2)$$

$$|f1_1/f1|\leq 1.5 \quad (3)$$

$$f1/D1_{12}>1 \quad (4)$$

$$0.1<Vd1_4/f1<Vd1_3/f1<50 \quad (5)$$

$$0.1<f1/Nd1_4<f1/Nd1_3<3 \quad (6)$$

$$D1_{34}/D1_{12}>0.02 \quad (7)$$

wherein $f1_1$ is an effective focal length of the first lens L11, $f1_2$ is an effective focal length of the second lens L12, $f1_3$ is an effective focal length of the third lens L13, $f1_4$ is an effective focal length of the fourth lens L14, f1 is an effective focal length of the lens assembly 1, BFL1 is an interval from the image side surface S19 of the fourth lens L14 to the image plane IMA1 along the optical axis OA1, TTL1 is an interval from the object side surface S11 of the first lens L11 to the image plane IMA1 along the optical axis OA1, $D1_{12}$ is an interval from the image side surface S12 of the first lens L11 to the object side surface S13 of the second lens L12 along the optical axis OA1, $D1_{34}$ is an interval from the image side surface S17 of the third lens L13 to the object side surface S18 of the fourth lens L14 along the optical axis OA1, $Vd1_3$ is an Abbe number of the third lens L13, $Vd1_4$ is an Abbe number of the fourth lens L14, $Nd1_3$ is an index of refraction of the third lens L13 and $Nd1_4$ is an index of refraction of the fourth lens L14.

By the above design of the lenses and stop ST1, the lens assembly 1 is provided with a shortened total lens length, a decreased F-number and an effective corrected aberration.

In order to achieve the above purposes and effectively enhance the optical performance, the lens assembly 1 in accordance with the first embodiment of the invention is provided with the optical specifications shown in Table 1, which include the effective focal length, F-number, total lens length, radius of curvature of each lens surface, thickness between adjacent surface, refractive index of each lens and Abbe number of each lens. Table 1 shows that the effective focal length is equal to 3.3127 mm, F-number is equal to 2.0 and total lens length is equal to 11.501 mm for the lens assembly 1 of the first embodiment of the invention.

TABLE 1

Effective Focal Length = 3.3127 mm F-number = 2.0
Total Lens Length = 11.501 mm

| Surface Number | Radius of Curvature (mm) | Thickness (mm) | Nd | Vd | Remark |
|---|---|---|---|---|---|
| S11 | −9.555 | 0.5 | 1.5346 | 56.07 | The First Lens L11 |
| S12 | 2.594 | 1.976 | | | |
| S13 | 6.167 | 1.968 | 1.4875 | 70.24 | The Second Lens L12 |
| S14 | −3.616 | 0 | | | |
| S15 | ∞ | 0.844 | | | Stop ST1 |
| S16 | 2.927 | 1.981 | 1.5346 | 56.07 | The Third Lens L13 |
| S17 | −2.234 | 0.1 | | | |
| S18 | −1.66 | 0.606 | 1.6142 | 25.58 | The Fourth Lens L14 |
| S19 | −17.286 | 2.688 | | | |
| S110 | ∞ | 0.735 | 1.5168 | 64.16 | Optical Filter OF1 |
| S111 | ∞ | 0.104 | | | |

The aspheric surface sag z of each lens in table 1 can be calculated by the following formula:

$$z = ch^2/\{1+[1-(k+1)c^2h^2]^{1/2}\} + Ah^4 + Bh^6 + Ch^8 + Dh^{10}$$

where c is curvature, h is the vertical distance from the lens surface to the optical axis, k is conic constant and A, B, C and D are aspheric coefficients.

In the first embodiment, the conic constant k and the aspheric coefficients A, B, C, D of each surface are shown in Table 2.

TABLE 2

| Surface Number | k | A | B | C | D |
|---|---|---|---|---|---|
| S11 | 7.1967 | 3.881E−4 | 2.969E−4 | −1.044E−5 | 0 |
| S12 | 0.1471 | 7.79E−3 | −3.024E−4 | 6.836E−4 | 0 |
| S16 | 0.051 | −4.225E−4 | 1.756E−4 | −3.422E−4 | 0 |
| S17 | −2.5091 | 1.039E−2 | 1.169E−3 | −7.28E−4 | 0 |
| S18 | −3.7936 | 1.336E−2 | 5.753E−4 | −4.55E−4 | 0 |
| S19 | 0 | 6.805E−2 | −1.624E−2 | 4.816E−3 | −5.549E−4 |

For the lens assembly 1 of the first embodiment, the effective focal length $fl_1$ of the first lens L11 is equal to −3.746 mm, the effective focal length $fl_2$ of the second lens L12 is equal to 4.99 mm, the effective focal length $fl_3$ of the third lens L13 is equal to 2.725 mm, the effective focal length $fl_4$ of the fourth lens L14 is equal to −3.004 mm, the effective focal length fl of the lens assembly 1 is equal to 3.3127 mm, the interval BFL1 from the image side surface S19 of the fourth lens L14 to the image plane IMA1 along the optical axis OA1 is equal to 3.527 mm, the interval TTL1 from the object side surface S11 of the first lens L11 to the image plane IMA1 along the optical axis OA1 is equal to 11.5 mm, the interval $D1_{12}$ from the image side surface S12 of the first lens L11 to the object side surface S13 of the second lens L12 along the optical axis OA1 is equal to 1.976 mm, the interval $D1_{34}$ from the image side surface S17 of the third lens L13 to the object side surface S18 of the fourth lens L14 along the optical axis OA1 is equal to 0.1 mm, the Abbe number $Vd1_3$ of the third lens L13 is equal to 56.07, the Abbe number $Vd1_4$ of the fourth lens L14 is equal to 25.58, the index of refraction $Nd1_3$ of the third lens L13 is equal to 1.5346 and the index of refraction $Nd1_4$ of the fourth lens L14 is equal to 1.6142. According to the above data, the following values can be obtained:

$|fl_1/fl_2|=0.751$, $|fl_4/fl_3|=1.102$, $BFL1/TTL1=0.307$, $|fl_1/fl|=1.131$, $fl/D1_{12}=1.676$, $Vd1_4/fl=7.721$, $Vd1_3/fl=16.926$, $fl/Nd1_4=2.052$, $fl/Nd1_3=2.159$, $D1_{34}/D1_{12}=0.051$ which respectively satisfy the above conditions (1)-(7).

Figure 2B:
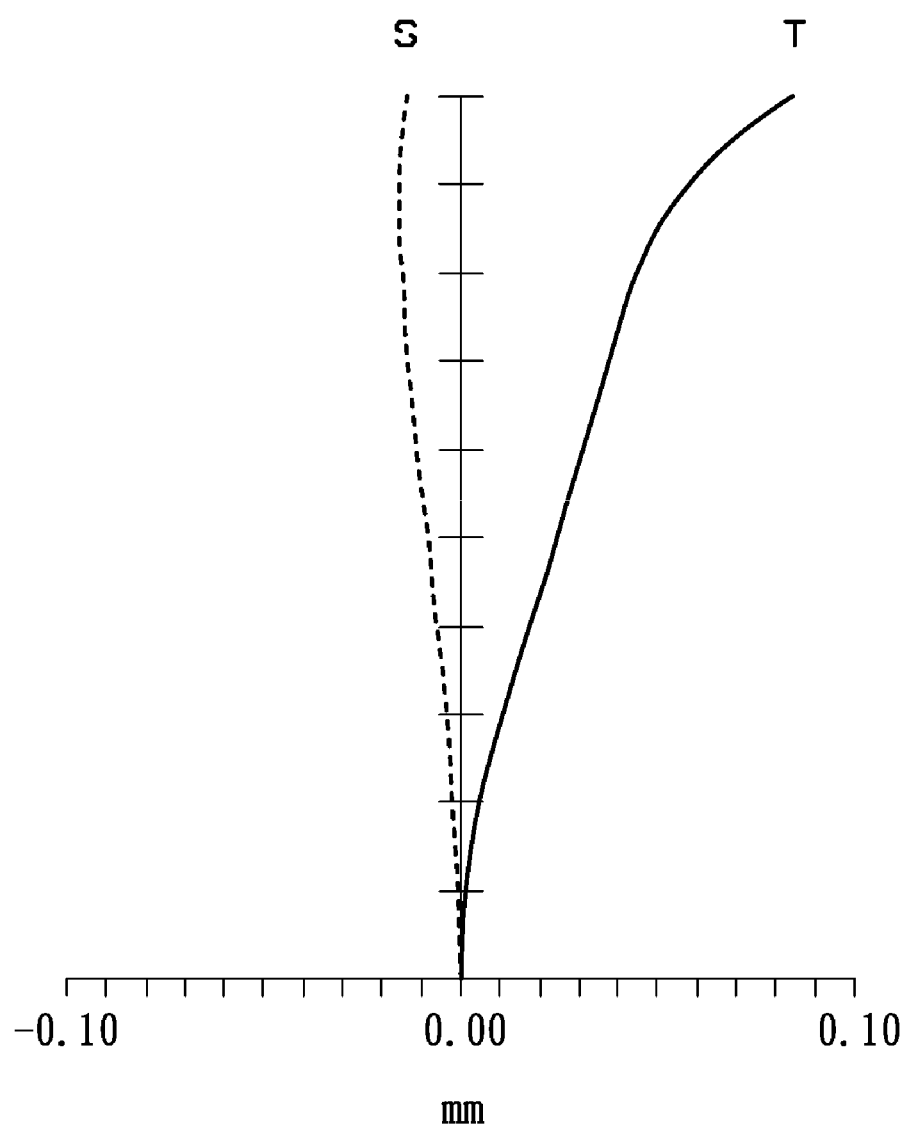
FIG. 2B is a field curvature diagram of the lens assembly in accordance with the first embodiment of the invention.
Figure 2C:
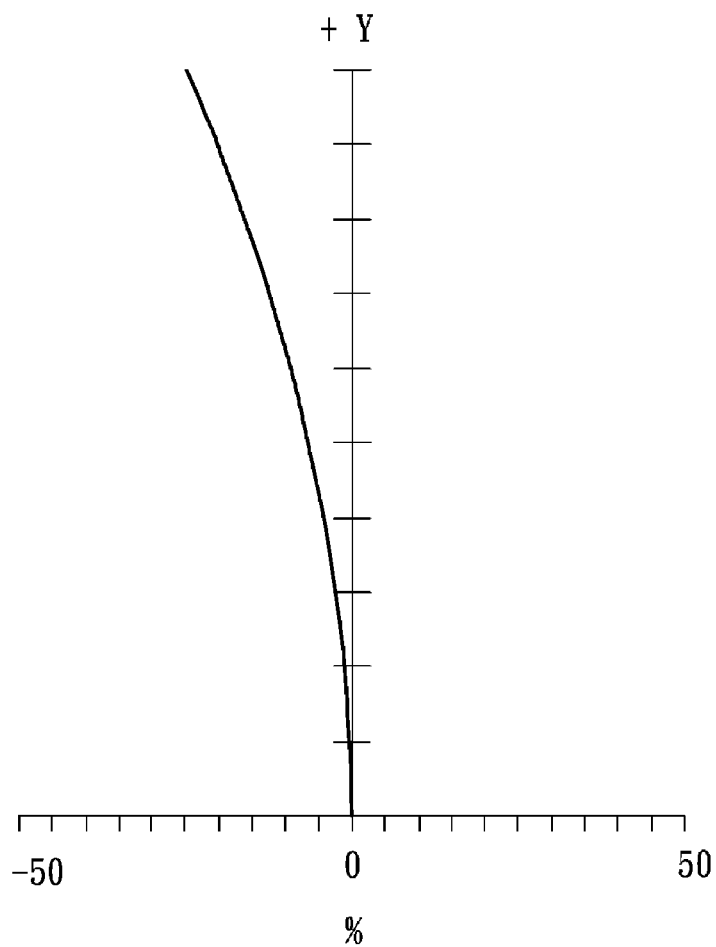
FIG. 2C is a distortion diagram of the lens assembly in accordance with the first embodiment of the invention.
Figure 2D:
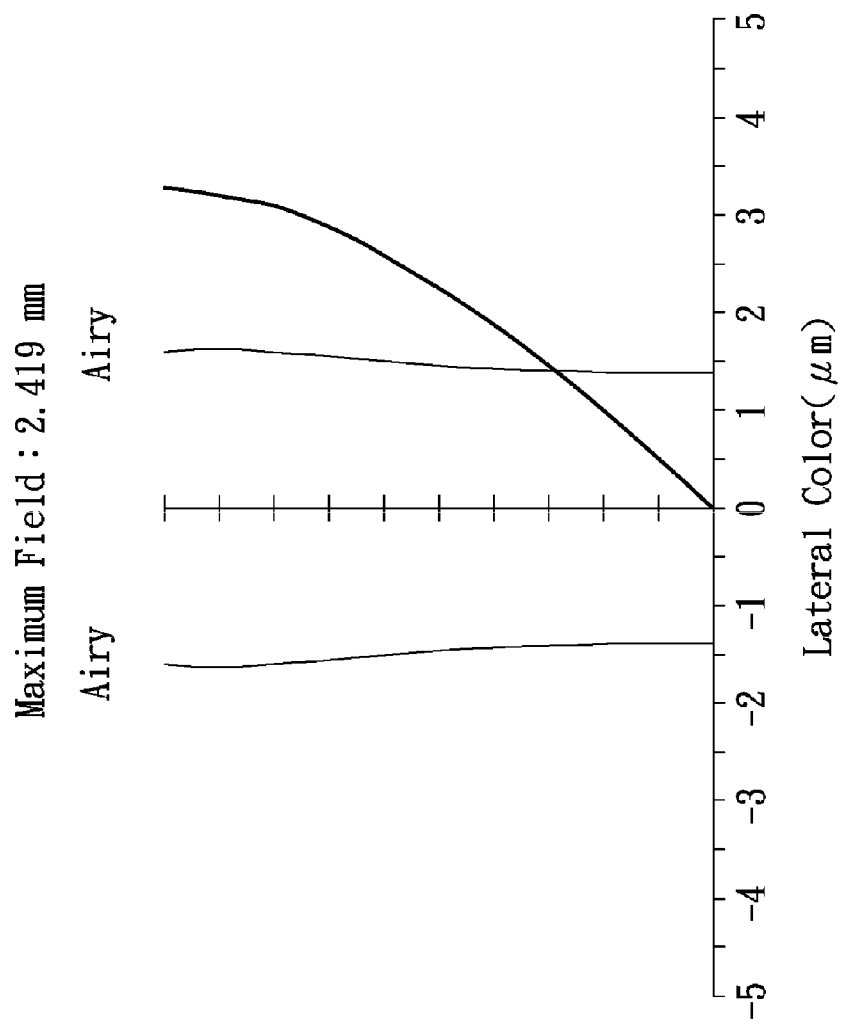
FIG. 2D is a lateral color diagram of the lens assembly in accordance with the first embodiment of the invention.

By the above arrangements of the lenses and stop ST1, the lens assembly 1 of the first embodiment can meet the requirements of optical performance as seen in FIGS. 2A-2D, wherein FIG. 2A shows the longitudinal aberration diagram of the lens assembly 1 in accordance with the first embodiment of the invention, FIG. 2B shows the field curvature diagram of the lens assembly 1 in accordance with the first embodiment of the invention, FIG. 2C shows the distortion diagram of the lens assembly 1 in accordance with the first embodiment of the invention and FIG. 2D shows the lateral color diagram of the lens assembly 1 in accordance with the first embodiment of the invention.

It can be seen from FIG. 2A that the longitudinal aberration in the lens assembly 1 of the first embodiment ranges from −0.006 mm to 0.015 mm for the wavelength of 0.436 μm, 0.486 μm, 0.546 μm, 0.587 μm and 0.656 μm. It can be seen from FIG. 2B that the field curvature of tangential direction and sagittal direction in the lens assembly 1 of the first embodiment ranges from −0.02 mm to 0.09 mm for the wavelength of 0.546 μm. It can be seen from FIG. 2C that the distortion in the lens assembly 1 of the first embodiment ranges from −25% to 0% for the wavelength of 0.546 μm. It can be seen from FIG. 2D that the lateral color in the lens assembly 1 of the first embodiment ranges from 0 μm to 3.5 μm for the wavelength ranges from 0.436 μm to 0.656 μm, with field ranged from 0 mm to 2.419 mm. It is obvious that the longitudinal aberration, the field curvature, the distortion and the lateral color of the lens assembly 1 of the first embodiment can be corrected effectively. Therefore, the lens assembly 1 of the first embodiment is capable of good optical performance.

Figure 3:
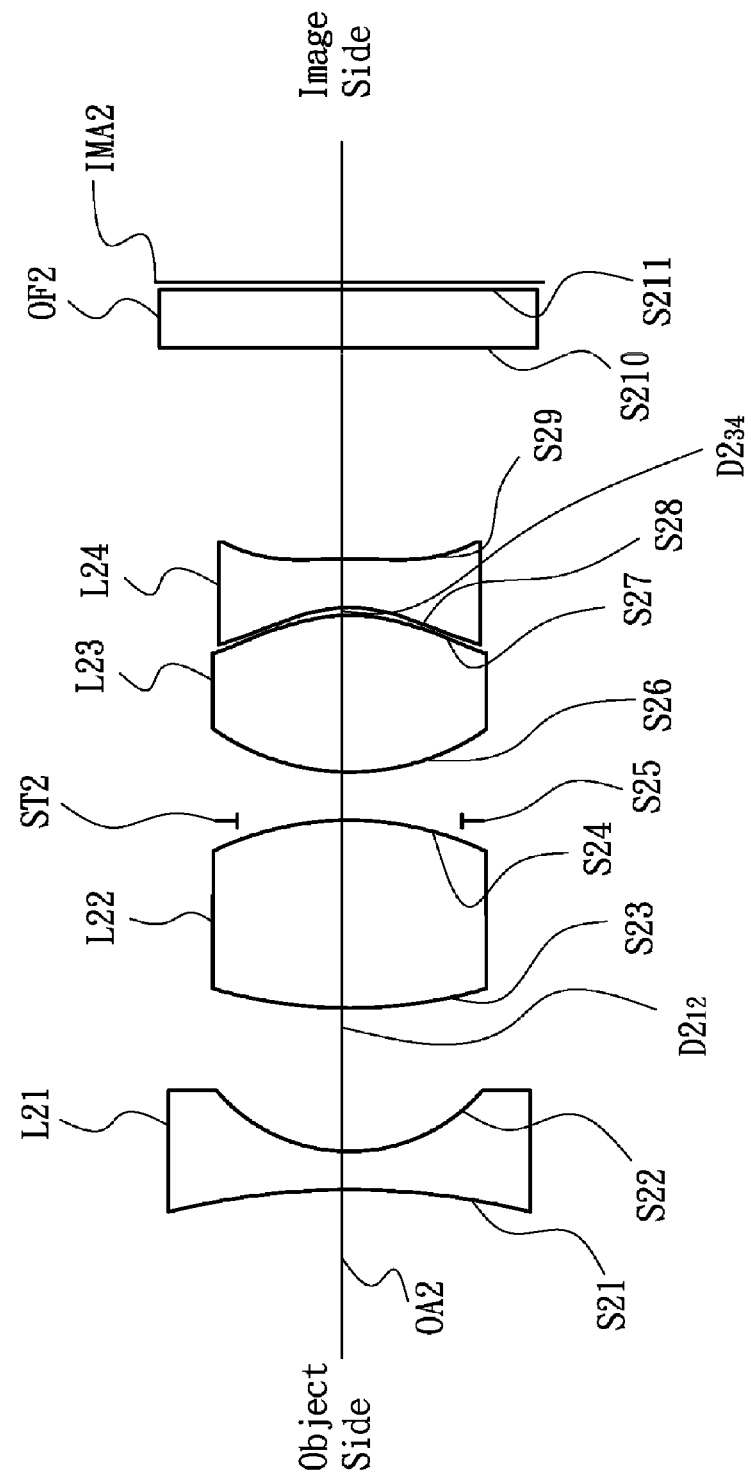
FIG. 3 is a lens layout diagram of a lens assembly in accordance with a second embodiment of the invention.

Referring to FIG. 3, FIG. 3 is a lens layout diagram of a lens assembly in accordance with a second embodiment of the invention. The lens assembly 2 includes a first lens L21, a second lens L22, a stop ST2, a third lens L23, a fourth lens L24 and an optical filter OF2, all of which are arranged in sequence from an object side to an image side along an optical axis OA2. In operation, an image of light rays from the object side is formed at an image plane IMA2. The first lens L21 is a biconcave lens with negative refractive and made of plastic material, wherein both of the object side surface S21 and image side surface S22 are aspheric surfaces. The second lens L22 is a biconvex lens with positive refractive power and made of plastic material, wherein both of the object side surface S23 and image side surface S24 are aspheric surfaces. The third lens L23 is a biconvex lens with positive refractive power and made of plastic material, wherein both of the object side surface S26 and image side surface S27 are aspheric surfaces. The fourth lens L24 is a concave-convex lens with negative refractive power and made of plastic material, wherein the object side surface S28 is a concave surface, the image side surface S29 is a convex surface and both of the object side surface S28 and image side surface S29 are aspheric surfaces. There is an air space between the third lens L23 and the fourth lens L24. Both of the object side surface S210 and image side surface S211 of the optical filter OF2 are plane surfaces.

In order to maintain excellent optical performance of the lens assembly in accordance with the second embodiment of the invention, the lens assembly 2 must satisfies the following seven conditions:

$$0<|f2_1/f2_2|<|f2_4/f2_3|<2 \quad (8)$$

$$BFL2/TTL2>0.4 \quad (9)$$

$$|f2_1/f2|\leq 1.5 \quad (10)$$

$$f2/D2_{12}>1 \quad (11)$$

$$0.1<Vd2_4/f2<Vd2_3/f2<50 \quad (12)$$

$$0.1<f2/Nd2_4<f2/Nd2_3<3 \quad (13)$$

$$D2_{34}/D2_{12}>0.02 \quad (14)$$

wherein $f2_1$ is an effective focal length of the first lens L21, $f2_2$ is an effective focal length of the second lens L22, $f2_3$ is an effective focal length of the third lens L23, $f2_4$ is an effective focal length of the fourth lens L24, $f2$ is an effective focal length of the lens assembly 2, BFL2 is an interval from the image side surface S29 of the fourth lens L24 to the image plane IMA2 along the optical axis OA2, TTL2 is an interval from the object side surface S21 of the first lens L21 to the image plane IMA2 along the optical axis OA2, $D2_{12}$ is an interval from the image side surface S22 of the first lens L21 to the object side surface S23 of the second lens L22 along the optical axis OA2, $D2_{34}$ is an interval from the image side surface S27 of the third lens L23 to the object side surface S28 of the fourth lens L24 along the optical axis OA2, $Vd2_3$ is an Abbe number of the third lens L23, $Vd2_4$ is an Abbe number of the fourth lens L24, $Nd2_3$ is an index of refraction of the third lens L23 and $Nd2_4$ is an index of refraction of the fourth lens L24.

By the above design of the lenses and stop ST2, the lens assembly 2 is provided with a shortened total lens length, a decreased F-number and an effective corrected aberration.

In order to achieve the above purposes and effectively enhance the optical performance, the lens assembly 2 in accordance with the second embodiment of the invention is provided with the optical specifications shown in Table 3, which include the effective focal length, F-number, total lens length, radius of curvature of each lens surface, thickness between adjacent surface, refractive index of each lens and Abbe number of each lens. Table 3 shows that the effective focal length is equal to 3.3124 mm, F-number is equal to 2.0 and total lens length is equal to 11.497 mm for the lens assembly 2 of the second embodiment of the invention.

TABLE 3

Effective Focal Length = 3.3124 mm F-number = 2.0
Total Lens Length = 11.497 mm

| Surface Number | Radius of Curvature (mm) | Thickness (mm) | Nd | Vd | Remark |
|---|---|---|---|---|---|
| S21 | −9.555 | 0.5 | 1.5346 | 56.07 | The First Lens L21 |
| S22 | 2.594 | 1.805 | | | |
| S23 | 6.52 | 2.363 | 1.5346 | 56.07 | The Second Lens L22 |
| S24 | −3.956 | 0 | | | |
| S25 | ∞ | 0.62 | | | Stop ST2 |
| S26 | 2.927 | 1.981 | 1.5346 | 56.07 | The Third Lens L23 |
| S27 | −2.234 | 0.1 | | | |
| S28 | −1.66 | 0.606 | 1.6142 | 25.58 | The Fourth Lens L24 |
| S29 | −17.286 | 2.688 | | | |
| S210 | ∞ | 0.735 | 1.5168 | 64.16 | Optical Filter OF2 |
| S211 | ∞ | 0.1 | | | |

The aspheric surface sag z of each lens in table 3 can be calculated by the following formula:

$$z=ch^2/\{1+[1-(k+1)c^2h^2]^{1/2}\}+Ah^4+Bh^6+Ch^8+Dh^{10}$$

where c is curvature, h is the vertical distance from the lens surface to the optical axis, k is conic constant and A, B, C and D are aspheric coefficients.

In the second embodiment, the conic constant k and the aspheric coefficients A, B, C, D of each surface are shown in Table 4.

TABLE 4

| Surface Number | k | A | B | C | D |
|---|---|---|---|---|---|
| S21 | 7.1967 | 3.881E-4 | 2.969E-4 | −1.044E-5 | 0 |
| S22 | 0.1471 | 7.79E-3 | −3.024E-4 | 6.836E-4 | 0 |
| S23 | 9.396 | −3.374E-3 | −8.706E-4 | 1.726E-4 | −8.132E-5 |
| S24 | 1.0842 | 5.767E-4 | 2.122E-3 | −1.058E-3 | 2.13E-4 |
| S26 | 0.051 | −4.225E-4 | 1.756E-4 | −3.422E-4 | 0 |
| S27 | −2.5091 | 1.039E-2 | 1.169E-3 | −7.28E-4 | 0 |
| S28 | −3.7936 | 1.336E-2 | 5.753E-4 | −4.55E-4 | 0 |
| S29 | 0 | 6.805E-2 | −1.624E-2 | 4.816E-3 | −5.549E-4 |

For the lens assembly 2 of the second embodiment, the effective focal length $f2_1$ of the first lens L21 is equal to −3.746 mm, the effective focal length $f2_2$ of the second lens L22 is equal to 4.978 mm, the effective focal length $f2_3$ of the third lens L23 is equal to 2.725 mm, the effective focal length $f2_4$ of the fourth lens L24 is equal to −3.044 mm, the effective focal length f2 of the lens assembly 2 is equal to 3.3124 mm, the interval BFL2 from the image side surface S29 of the fourth lens L24 to the image plane IMA2 along the optical axis OA2 is equal to 3.523 mm, the interval TTL2 from the object side surface S21 of the first lens L21 to the image plane IMA2 along the optical axis OA2 is equal to 11.497 mm, the interval $D2_{12}$ from the image side surface S22 of the first lens L21 to the object side surface S23 of the second lens L22 along the optical axis OA2 is equal to 1.805 mm, the interval $D2_{34}$ from the image side surface S27 of the third lens L23 to the object side surface S28 of the fourth lens L24 along the optical axis OA2 is equal to 0.1 mm, the Abbe number $Vd2_3$ of the third lens L23 is equal to 56.07, the Abbe number $Vd2_4$ of the fourth lens L24 is equal to 25.58, the index of refraction $Nd2_3$ of the third lens L23 is equal to 1.5346 and the index of refraction $Nd2_4$ of the fourth lens L24 is equal to 1.6142. According to the above data, the following values can be obtained:

$|f2_1/f2_2|=0.752$, $|f2_4/f2_3|=1.102$, $BFL2/TTL2=0.306$, $|f2_1/f2|=1.131$, $f2/D2_{12}=1.835$, $Vd2_4/f2=7.721$, $Vd2_3/f2=16.928$, $f2/Nd2_4=2.051$, $f2/Nd2_3=2.158$, $D2_{34}/D2_{12}=0.055$ which respectively satisfy the above conditions (8)-(14).

Figure 4B:
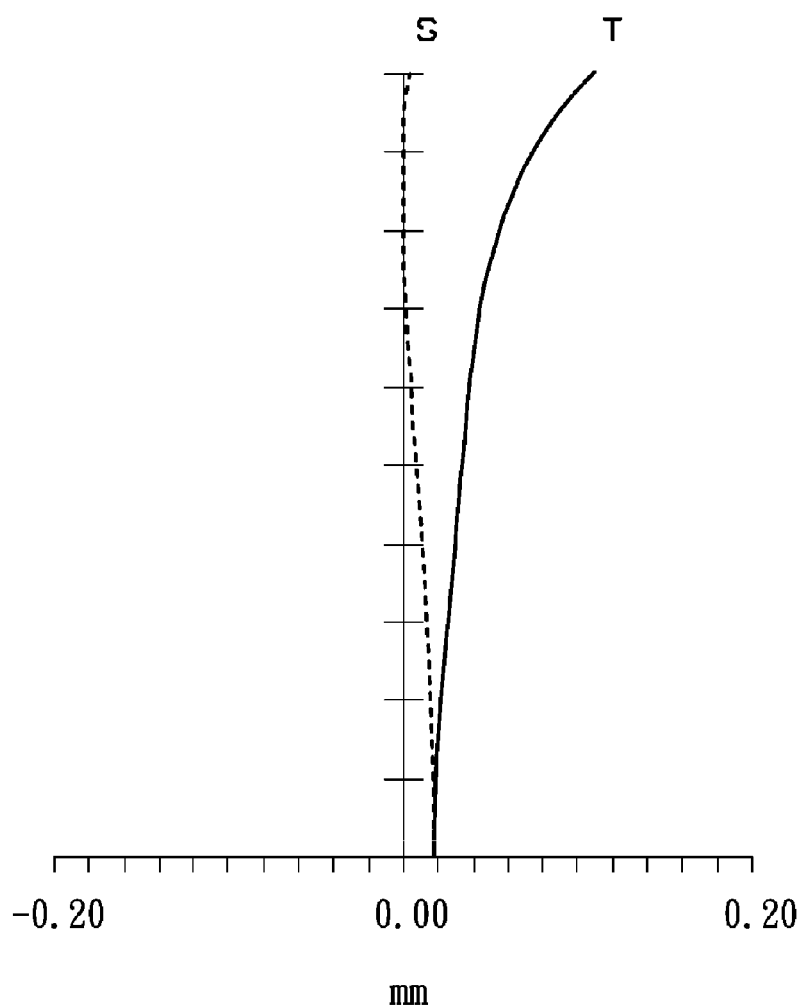
FIG. 4B is a field curvature diagram of the lens assembly in accordance with the second embodiment of the invention.
Figure 4C:
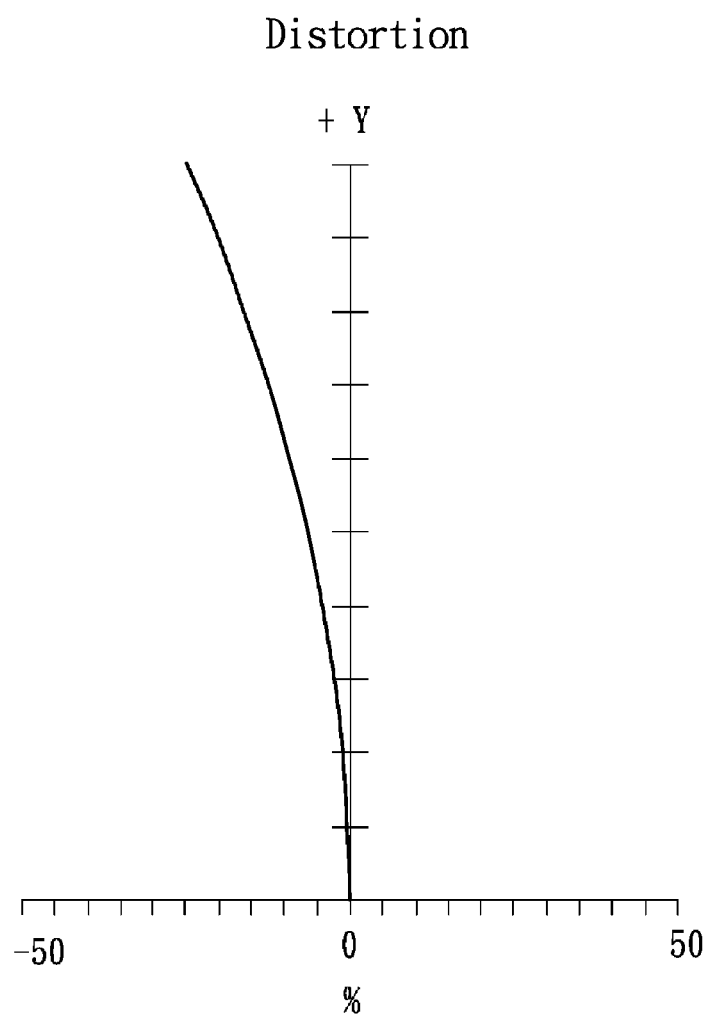
FIG. 4C is a distortion diagram of the lens assembly in accordance with the second embodiment of the invention.

By the above arrangements of the lenses and stop ST2, the lens assembly 2 of the second embodiment can meet the requirements of optical performance as seen in FIGS. 4A-4D, wherein FIG. 4A shows the longitudinal aberration diagram of the lens assembly 2 in accordance with the second embodiment of the invention, FIG. 4B shows the field curvature diagram of the lens assembly 2 in accordance with the second embodiment of the invention, FIG. 4C shows the distortion diagram of the lens assembly 2 in accordance with the second embodiment of the invention and FIG. 4D shows the lateral color diagram of the lens assembly 2 in accordance with the second embodiment of the invention.

It can be seen from FIG. 4A that the longitudinal aberration in the lens assembly 2 of the second embodiment ranges from −0.003 mm to 0.045 mm for the wavelength of 0.436 μm, 0.486 μm, 0.546 μm, 0.587 μm and 0.656 μm. It can be seen from FIG. 4B that the field curvature of tangential direction and sagittal direction in the lens assembly 2 of the second embodiment ranges from 0.00 mm to 0.12 mm for the wavelength of 0.546 μm. It can be seen from FIG. 4C that the distortion in the lens assembly 2 of the second embodiment ranges from −30% to 0% for the wavelength of 0.546 μm. It can be seen from FIG. 4D that the lateral color in the lens assembly 2 of the second embodiment ranges from 0.5 μm to 1.5 μm for the wavelength ranges from 0.436 μm to 0.656 μm, with field ranged from 0 mm to 2.419 mm. It is obvious that the longitudinal aberration, the field curvature, the distortion and the lateral color of the lens assembly 2 of the second embodiment can be corrected effectively. Therefore, the lens assembly 2 of the second embodiment is capable of good optical performance.

What is claimed is:

1. A lens assembly comprising a first lens, a second lens, a stop, a third lens and a fourth lens, all of which are arranged in sequence from an object side to an image side along an optical axis, wherein:
the first lens is a biconcave lens with negative refractive power and comprises an object side surface and an image side surface, wherein at least one of the object side surface and the image side surface is an aspheric surface;
the second lens is a biconvex lens with positive refractive power;
the third lens is a biconvex lens with positive refractive power and comprises an object side surface and an image side surface, wherein at least one of the object side surface and the image side surface is an aspheric surface;
the fourth lens is with negative refractive power and comprises an object side surface and an image side surface, wherein at least one of the object side surface and the image side surface is an aspheric surface; and
the lens assembly satisfies:

$0<|f_1/f_2|<|f_4/f_3|<2$, $f/D_{12}>1$ wherein $f_1$ is an effective focal length of the first lens, $f_2$ is an effective focal length of the second lens, $f_3$ is an effective focal length of the third lens, $f_4$ is an effective focal length of the fourth lens, f is an effective focal length of the lens assembly and $D_{12}$ is an interval from an image side surface of the first lens to an object side surface of the second lens along the optical axis.

2. The lens assembly as claimed in claim 1, wherein the third lens and the fourth lens satisfy:

$0.1<Vd_4/f<Vd_3/f<50$, wherein $Vd_4$ is an Abbe number of the fourth lens, $Vd_3$ is an Abbe number of the third lens and f is an effective focal length of the lens assembly.

3. The lens assembly as claimed in claim 1, wherein the lens assembly satisfies:

$D_{34}/D_{12}>0.02$, wherein $D_{12}$ is an interval from an image side surface of the first lens to an object side surface of the second lens along the optical axis, and $D_{34}$ is an interval from an image side surface of the third lens to an object side surface of the fourth lens along the optical axis.

4. The lens assembly as claimed in claim 1, wherein the first lens, the third lens and the fourth lens are made of plastic material, and the second lens is made of glass material.

5. The lens assembly as claimed in claim 1, wherein the first lens, the second lens, the third lens and the fourth lens are made of plastic material.

6. A lens assembly comprising a first lens, a second lens, a stop, a third lens and a fourth lens, all of which are arranged in sequence from an object side to an image side along an optical axis, wherein:
the first lens is a biconcave lens with negative refractive power and comprises an object side surface and an image side surface, wherein at least one of the object side surface and the image side surface is an aspheric surface;
the second lens is a biconvex lens with positive refractive power;
the third lens is a biconvex lens with positive refractive power and comprises an object side surface and an image side surface, wherein at least one of the object side surface and the image side surface is an aspheric surface;
the fourth lens is with negative refractive power and comprises an object side surface and an image side surface, wherein at least one of the object side surface and the image side surface is an aspheric surface; and
the lens assembly satisfies:

$0<|f_1/f_2|<|f_4/f_3|<2$, $BFL/TTL<0.4$ wherein $f_1$ is an effective focal length of the first lens, $f_2$ is an effective focal length of the second lens, $f_3$ is an effective focal length of the third lens, $f_4$ is an effective focal length of the fourth lens, BFL is an interval from an image side surface of the fourth lens to an image plane along the optical axis and TTL is an interval from an object side surface of the first lens to the image plane along the optical axis.

7. A lens assembly comprising a first lens, a second lens, a stop, a third lens and a fourth lens, all of which are arranged in sequence from an object side to an image side along an optical axis, wherein:
   the first lens is a biconcave lens with negative refractive power and comprises an object side surface and an image side surface, wherein at least one of the object side surface and the image side surface is an aspheric surface;
   the second lens is a biconvex lens with positive refractive power;
   the third lens is a biconvex lens with positive refractive power and comprises an object side surface and an image side surface, wherein at least one of the object side surface and the image side surface is an aspheric surface;
   the fourth lens is with negative refractive power and comprises an object side surface and an image side surface, wherein at least one of the object side surface and the image side surface is an aspheric surface; and
   the lens assembly satisfies:

$0<|f_1/f_2|<|f_4/f_3|<2$, $|f_1/f|\leq1.5$ wherein $f_1$ is an effective focal length of the first lens, $f_2$ is an effective focal length of the second lens, $f_3$ is an effective focal length of the third lens, $f_4$ is an effective focal length of the fourth lens and f is an effective focal length of the lens assembly.

8. A lens assembly comprising a first lens, a second lens, a stop, a third lens and a fourth lens, all of which are arranged in sequence from an object side to an image side along an optical axis, wherein:
   the first lens is a biconcave lens with negative refractive power and comprises an object side surface and an image side surface, wherein at least one of the object side surface and the image side surface is an aspheric surface;
   the second lens is a biconvex lens with positive refractive power;
   the third lens is a biconvex lens with positive refractive power and comprises an object side surface and an image side surface, wherein at least one of the object side surface and the image side surface is an aspheric surface;
   the fourth lens is with negative refractive power and comprises an object side surface and an image side surface, wherein at least one of the object side surface and the image side surface is an aspheric surface; and
   the lens assembly satisfies:

$0<|f_1/f_2|<|f_4/f_3|<2$, $0.1<f/Nd_4<f/Nd_3<3$ wherein $f_1$ is an effective focal length of the first lens, $f_2$ is an effective focal length of the second lens, $f_3$ is an effective focal length of the third lens, $f_4$ is an effective focal length of the fourth lens, f is an effective focal length of the lens assembly, $Nd_3$ is an index of refraction of the third lens and $Nd_4$ is an index of refraction of the fourth lens.

9. A lens assembly comprising a first lens, a second lens, a stop, a third lens and a fourth lens, all of which are arranged in sequence from an object side to an image side along an optical axis, wherein:
   the first lens is a biconcave lens with negative refractive power;
   the second lens is a biconvex lens with positive refractive power;
   the third lens is a biconvex lens with positive refractive power;
   the fourth lens is with negative refractive power; and
   the lens assembly satisfies:

$0<|f_1/f_2|<|f_4/f_3|<2$, $BFL/TTL<0.4$, $|f_1/f|\leq1.5$, $f/D_{12}>1$, $0.1<Vd_4/f<Vd_3/f<50$, $0.1<f/Nd_4<f/Nd_3<3$, $D_{34}/D_{12}>0.02$ wherein $f_1$ is an effective focal length of the first lens, $f_2$ is an effective focal length of the second lens, $f_3$ is an effective focal length of the third lens, $f_4$ is an effective focal length of the fourth lens, f is an effective focal length of the lens assembly, BFL is an interval from an image side surface of the fourth lens to an image plane along the optical axis, TTL is an interval from an object side surface of the first lens to the image plane along the optical axis, $D_{12}$ is an interval from an image side surface of the first lens to an object side surface of the second lens along the optical axis, $D_{34}$ is an interval from an image side surface of the third lens to an object side surface of the fourth lens along the optical axis, $Vd_3$ is an Abbe number of the third lens, $Vd_4$ is an Abbe number of the fourth lens, $Nd_3$ is an index of refraction of the third lens and $Nd_4$ is an index of refraction of the fourth lens.

* * * * *